United States Patent
Hardman

(10) Patent No.: US 9,453,308 B2
(45) Date of Patent: Sep. 27, 2016

(54) LAWN GRID AND METHOD

(75) Inventor: Eric Hardman, Riehen (CH)

(73) Assignee: Erziehungsdepartment BS Sportamt, Basel (CH)

( * ) Notice: Subject to any disclaimer, the term of this patent is extended or adjusted under 35 U.S.C. 154(b) by 0 days.

(21) Appl. No.: 14/113,426

(22) PCT Filed: Apr. 4, 2012

(86) PCT No.: PCT/EP2012/056176
§ 371 (c)(1),
(2), (4) Date: Jan. 22, 2014

(87) PCT Pub. No.: WO2012/136710
PCT Pub. Date: Oct. 11, 2012

(65) Prior Publication Data
US 2014/0133918 A1    May 15, 2014

(30) Foreign Application Priority Data
Apr. 8, 2011 (CH) .................................. 0634/11

(51) Int. Cl.
| | | |
|---|---|---|
| *E01C 13/02* | (2006.01) | |
| *E01C 13/08* | (2006.01) | |
| *E01C 9/00* | (2006.01) | |
| *E01C 13/10* | (2006.01) | |
| *F24J 2/04* | (2006.01) | |

(52) U.S. Cl.
CPC .............. *E01C 13/083* (2013.01); *E01C 9/004* (2013.01); *E01C 13/105* (2013.01); *F24J 2/0422* (2013.01)

(58) Field of Classification Search
CPC ........................................................ A01G 1/002
USPC ........ 405/36, 37, 43, 130, 131, 302.4, 302.7; 165/45
See application file for complete search history.

(56) References Cited

U.S. PATENT DOCUMENTS

| | | | | |
|---|---|---|---|---|
| 5,850,708 | A | * 12/1998 | Bergevin | A63C 19/04 428/17 |
| 2009/0052990 | A1 | * 2/2009 | Richardson | 405/43 |

FOREIGN PATENT DOCUMENTS

| | | | |
|---|---|---|---|
| DE | 202007008100 | * | 6/2007 |
| EP | 0770733 | * | 5/1997 |

* cited by examiner

*Primary Examiner* — Sean Andrish
(74) *Attorney, Agent, or Firm* — Hammer & Associates, P.C.

(57) ABSTRACT

A lawn grid is provided with pipelines for a heat transfer medium. By using this lawn grid, a turf which can be used for summer operation can be integrated in winter into the structure of an artificial ice rink and/or the turf can be kept free of frost in winter by means of a surface lawn heating. Moreover, the lawn grid can be used for the active and passive recovery of solar heat. The invention further includes methods for the production of an artificial ice rink on a turf and for collection of solar energy in an outdoor facility using such a lawn grid.

4 Claims, 4 Drawing Sheets

LAWN GRID AND METHOD

TECHNICAL FIELD

Figure 1:
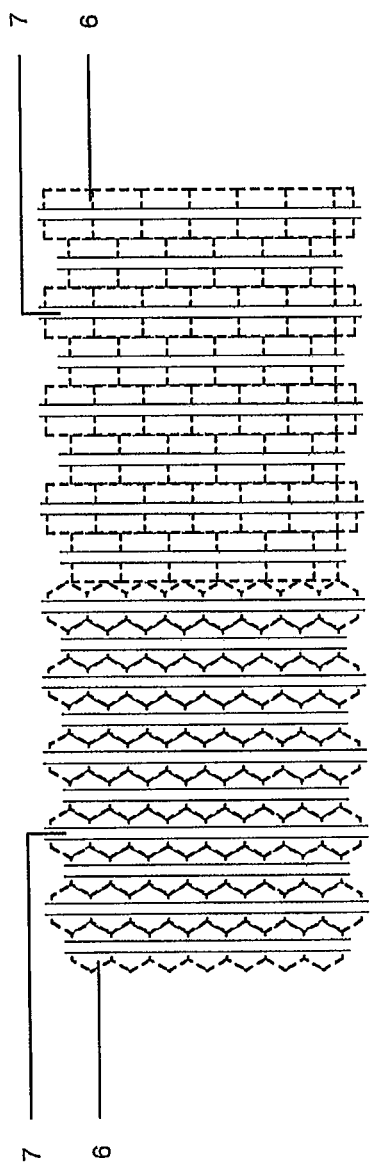

The invention relates to a lawn grid for increasing the ability of a turf to withstand mechanical stress. The invention furthermore relates to use of the lawn grid in sports and recreational facilities and surfaces that are otherwise used only slightly or not at all, such as, for example, roof surfaces, embankments, etc. The invention furthermore relates to a method for the production of an artificial ice rink.

For the purpose of this description, the following definitions shall apply:

The term turf is understood to be the natural plant covering of the soil or of a substrate, by grasses and ground cover, including their roots.

The term lawn grid comprises all the structural elements to be laid into or having been laid into a turf, which increase the ability of the turf to withstand mechanical stress or prevent heavy equipment, vehicle wheels, etc., from sinking into it.

The term lawn energy grid system is used for a lawn grid having a piping system laid into it, for conducting a heat transfer medium through it, in order to supply heat energy or conduct it away. The grid system can also be laid into surfaces without plants, and is then referred to as an energy grid system.

The term summer operation is used, independent of the seasons according to the calendar, for use of a sports and recreational facility without ice, while the term winter operation is used for use of the same facility as an artificial ice rink.

The term recreational facility comprises sports fields and playgrounds, areas for lying down, and the like, in the public and private sector.

The term heat transfer medium also comprises refrigerants for drawing out heat.

In the state of the art, facilities for use not only in summer operation but also in winter operation are known. In this connection, the surface for summer operation is generally a hard surface, for example a PU-bound quartz sand surface, which is covered, for summer operation, with an artificial turf in the form of mats or strips. It is also already known to integrate the artificial turf into the ice structure for winter operation.

BACKGROUND OF THE INVENTION

In the known facilities, a layer having a piping system for a refrigerant, which is cooled to the temperatures required for production of the ice rink by means of usual cold generators, and pumped through the piping system, is situated under the surface. Underneath that, there are additional functional layers, such as, for example, a cold storage layer, heat insulation layer, support layers, etc.

These known facilities have the disadvantage that the top surfaces or the artificial turf is/are unsuitable for many uses, such as areas for lying down around swimming pools.

It is also already known to set up artificial ice rinks on top of natural turf areas. For this purpose, mobile artificial ice rinks are generally used, which consist of transportable modules that contain the coolant lines, and are laid out on the area provided. Measures for protecting the natural turf might be required. This solution is complicated in multiple aspects, for example transport, storage of the modules during the summer, etc.

What are called lawn grids are also known, for example the product "Rasenwabe nach Ing. Prestele" [lawn honeycomb according to Engineer Prestele] from the company Savuna GmbH, with hexagonal grid chambers in honeycomb shape. Other chamber shapes, for example square chamber shapes, are also known. They are preferably used for unsealing of used areas, by means of planting with simultaneous reinforcement, for example fire truck driveways or parking areas, as well as for recreational facilities such as campgrounds, etc.

A pipeline system for cooling or heating of surfaces, particularly for the production of an ice-skating rink, is also known from EP 770733, in which the pipes are laid into grid-shaped elements. After the grid elements have been filled with sand, an artificial turf is laid down, which can be integrated into the structure of a skating rink.

SUMMARY OF THE INVENTION

The invention is based on the task of expanding the area of use and the functional utilization of lawn grids with integrated piping.

According to the invention, this task is accomplished by the characteristics of the independent claims.

BRIEF DESCRIPTION OF THE INVENTION

Figure 2:
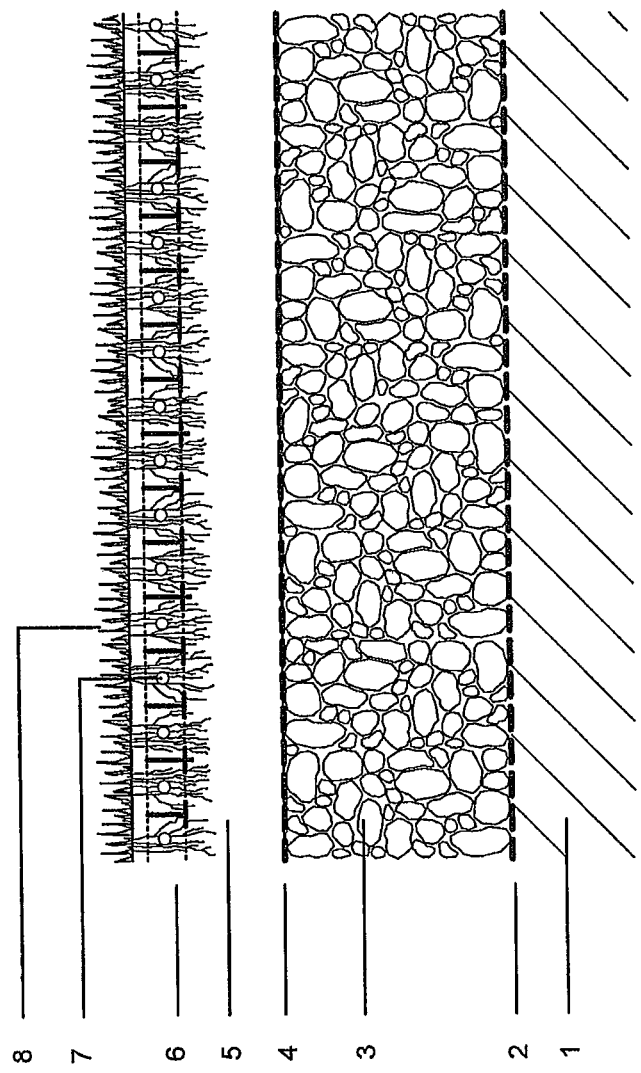
Figure 3:
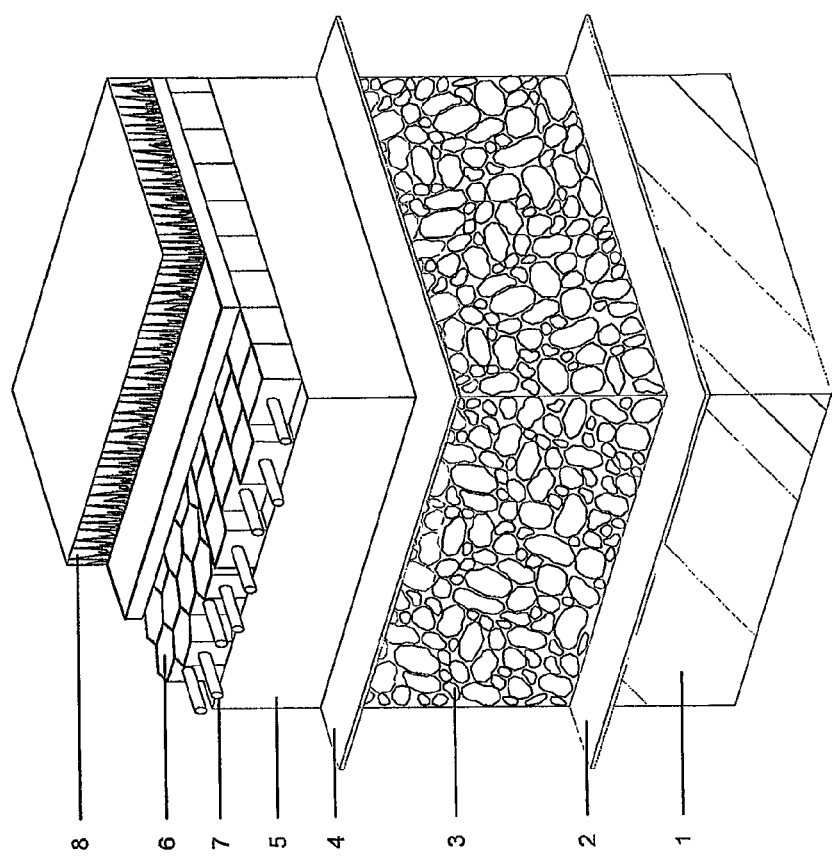
Figure 4:
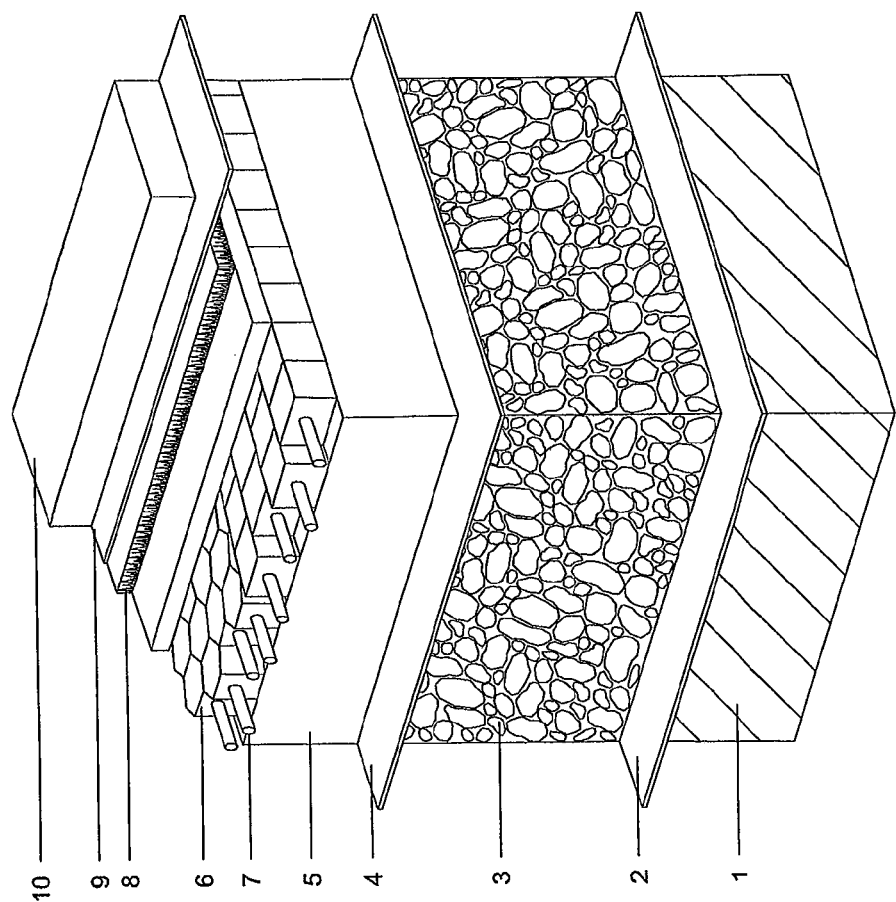

In the following, preferred exemplary embodiments of the invention will be described using the attached drawings. These show:

FIG. 1 a top view of a lawn grid element with lines for a heat transfer medium,

FIG. 2 a schematic sectional representation of the basic layer structure of a sports and recreational facility, FIG. 3 a schematic three-dimensional representation of the layer structure of a facility in summer operation, FIG. 4 a schematic three-dimensional representation of the layer structure of a facility in winter operation.

DESCRIPTION OF EMBODIMENTS

The lawn grid 6 shown in FIG. 1 is shown half with hexagonal chambers and half with square chambers, only for the sake of the illustration. It serves as a support for pipelines 7 that are filled with a heat transfer medium, i.e. it flows through them. For this purpose, recesses are provided in the perpendicular partition walls of the grid chambers, in the grid pattern provided for the pipelines, into which recesses the pipelines are laid. These recesses are bores in the partition walls, having a bore diameter that is slightly greater than the outside diameter of the pipes. Alternatively, the recesses can also be depressions in the top edge of the partition walls, where the depressions can be configured in such a manner that they have a narrowed part through which the pipes are pressed and engage.

In the case of a hexagonal grid having a chamber corner dimension of 7 cm, the pipelines are spaced apart by approximately 5.5 cm, and are disposed so deep within the grid that they are completely covered by a substrate fill. Of course, depending on the intended area of use, other grid pattern dimensions are also possible. Known materials, such as, for example, metals or plastics, or composite pipes made of these materials, are used for the lines. Pipes having an inside diameter of 12-25 mm have proven to be practical for most applications.

Lawn grids are usually available in the form of panels, which can be laid over the full area intended for the turf to be strengthened. The panel size can vary and can amount to as much as several square meters. For certain applications, material in the form of rolls, with pipes already laid into it, is also suitable.

For the piping, either long pipe material can be introduced into the laid-out grids. Alternatively, the panels can already be provided with pipe sections, which are joined together when the panels are laid. For this purpose, the ends of the pipe pieces are provided with suitable plug-in or screw-type connections.

After the grid panels have been laid and the pipelines have been connected to form one or more circuits, the lawn grid is filled with substrate up a level at which the grid partition walls and the piping are covered. In the finished facility, the turf is rooted essentially in this substrate, which is situated in and above the chambers of the grid and surrounds and covers the pipelines.

The pipelines that run in the lawn grid are filled with a heat transfer medium, i.e. it flows through them. For this purpose, different fluids are possible, for example water, coolant, etc.

The system composed of lawn grid and pipelines can be used in many different ways. A preferred use is use for structuring a facility that can be used for sports and recreation during the summer and can be integrated into an ice rink for winter operation.

With the use of the system composed of lawn grid and pipelines, however, in contrast to the known solutions, the natural turf is integrated into the ice structure for winter operation. The structure of such a facility is shown in section in FIG. 2 and in perspective in FIGS. 3 and 4, where once again, two different chamber shapes are shown for the lawn grid.

As shown in FIG. 2 in section and in FIG. 3 in perspective, the layer structure of the facility is situated on a construction soil 1 that is present and has been prepared for the structure. Depending on the water permeability of the construction soil, it can be necessary to provide drainage lines in the construction soil, in usual manner. For thermal uncoupling from the construction soil, a heat insulation layer 3 is applied to it, which layer is separated from the surface of the construction soil by a layer 2 composed of a geotextile. The thickness of the insulation layer amounts to approximately 30 cm in the present exemplary embodiment. Foam glass gravel has proven to be practical as a material for the insulating layer. However, other insulation materials can also be used, and the layer thickness can also vary. Above the insulation layer 3, once again separated by a layer 4 of geotextile, there is a turf support layer 5 according to DIN 18035, i.e. with suitable water retention capacity and, at the same time, water permeability, in a thickness of 20 cm, for example. The lawn support layer accordingly consists of a substrate that allows and promotes intensive root formation of grass and ground cover.

In its upper region, a lawn grid 6 of the type described above is embedded into the lawn support layer. The lawn support layer extends, in this application, by approximately 2 cm beyond the top edges of the lawn grid, for example. Above that, the vegetation 8 composed of grass and ground cover develops.

In the structure for winter operation shown in FIG. 4, the structure is identical with the structure described for summer operation, up to the vegetation 8. To prepare for winter operation, the vegetation is uniformly cut down, preferably to a few millimeters. Furthermore, the pipelines are filled with a heat transfer medium and connected with cold generators. Afterward, the substrate is saturated with water, for example by means of sprinkling, and completely frozen, together with the turf, by means of the heat transfer medium, as the result of heat being drawn away. Furthermore, the turf is covered with a light-impermeable film 9, for example composed of water-permeable PE. On this film, an ice layer 10 is produced by means of uniform application of water, which layer forms the artificial ice rink. It preferably has a thickness of at least 3 cm, preferably 5-8 cm. The film 9 is preferably white and is provided with hockey rink markings, etc., if necessary.

By means of this structure for winter operation, an ice rink that is sufficiently strong to support ice resurfacing equipment is obtained. By means of completely freezing the turf, which corresponds to natural conditions in a cold environment, the strength is supported, on the one hand, and the turf is protected, on the other hand.

During ice production and maintenance of the ice surface during winter operation, the cold generators produce heat that can be used elsewhere for heating purposes.

After the end of winter operation, the turf surface can be heated by means of the heat transfer medium, in order to end ice production within a short time and afterwards to promote growth of the turf.

It has been shown that the turf survives freezing over several months and grows again after the ice is removed. If this growth is too slow for the intended summer use, reseeding can also take place.

A significant advantage of this solution consists in that a natural turf is perceived as being pleasant during summer operation, for example a meadow for lying down, in contrast to artificial turf. Natural turf furthermore has a positive effect on the micro-climate of the surroundings and is beneficial for the environment because of its photosynthesis, in contrast to artificial turf or a hard surface, and can provide the daily oxygen requirement for the immediate vicinity.

Another advantage consists in that the combination can also be used in park facilities and can be structured there, for example, in such a manner that a particularly attractive ice surface can be structured in the free form of a meadow in a park, with the inclusion of trees.

In addition to the advantages of utilization of the same facility for summer operation and winter operation, there are other advantages. The facility can be used in different ways to collect solar energy. In summer operation, the energy collected can be used, by means of utilization of the heat transfer medium for conducting away the incident solar heat, in combination with the cold generators and heat exchangers, for example to heat shower water and even to heat a swimming pool.

Alternatively, the pipeline network can be filled with water for summer operation, and connected directly with the swimming pool to form a circuit in which the part of the pipe system that runs in the turf serves for heat collection.

Such further preferred use of the system composed of lawn grid and piping consists in using the system on sports fields, particularly on soccer fields, and in sports stadiums or soccer stadiums. Using the lawn energy grid system, it is possible to implement lawn heating in the uppermost layer of the lawn support layer, which lies only approximately 3-7 cm below the turf. This can be implemented in sports stadiums without impairing play and maintenance. Ventilation or maintenance of the uppermost surface is performed by means of a spiked roller or a spring-tine weeder harrow.

Because of the closeness to the surface, this solution of lawn heating has the great advantage that significantly less energy is required for lawn heating than for all other lawn heating systems currently known. Today's lawn heating systems for natural turf are always at a depth of at least 25 to 30 cm, as a standard dimension and for reasons of maintenance technology, and therefore require significantly more energy for protecting the lawn from frost and freezing. At a rough estimate, it is assumed that 1° of heat loss occurs per centimeter of lawn support layer. Using the lawn energy grid system, the lawn therefore requires many times less energy, because the energy for a frost-free field only has to be emitted upward from a depth of 5-7 cm.

Furthermore, using the lawn energy grid system installed into a playing field, an ice surface for hockey or other use can be produced on the natural turf of the playing field during a time when there are no games, when the sports field or the stadium is not used for lawn sports.

Driving on the lawn surface with heavy equipment and trucks up to 40 tons for events and entertainment is possible without damage to the lawn support layer. During concerts, however, the lawn might have to be replaced or reinforced with rolled-out artificial turf. No further leveling work in and on the lawn support layer is required.

A further preferred use of the energy grid system is use as a collector for solar heat in areas that otherwise are not used or are at least not used intensively, i.e. preferably roof surfaces, embankments, and the like. Likewise, the system can be operated with an active heat pump and thereby produce energy year round on flat roofs and embankments. This is done either by means of direct sun impact or only with the ambient temperature. The power of the heat pumps required for this can be designed for a single-family house or for the power requirements of an entire village or industrial area. In this connection, the surfaces utilized in this manner can either be planted or can preferably be covered with a material that is particularly efficient in absorbing heat radiation, for example a dark granulate such as basalt gravel with a preferred grain size of 2-8 mm or something similar. This also prevents rapid aging of the plastics as the result of direct UV radiation from the sun. It has proven to be practical to interrupt non-planted areas with strip-shaped areas with vegetation, at regular intervals, in order to reduce heat loss caused by horizontal air flows, and, at the same time, to achieve an attractive appearance. When used on embankments, the installed energy grid system also simultaneously serves the function of preventing wash-outs, to a great extent. When used for roof vegetation and, in part, also for embankments and the like, a material having a lesser water retention capacity, for example according to DIN 4095, is preferably used as a substrate.

In view of the enormous non-utilized embankment areas along roads and rail lines, preferably with a southern exposure, which are not suitable for energy collection by means of photovoltaic elements or conventional solar collectors because of the mechanical sensitivity of these elements or collectors, a high energy collection potential exists with utilization by means of energy grid systems.

The invention claimed is:

1. A method for the production of an artificial ice rink on a surface suitable for summer operation, using a device for seasonal application of an ice layer usable as the artificial ice rink, the surface having a substructure that is sufficiently strong to support the use of ice resurfacing equipment, and having a line network for a heat transfer medium that is disposed directly below the surface, wherein the surface includes a turf that is rooted in a substrate-filled lawn grid comprising a plurality of chambers separated from one another by partition walls, a pipeline laid into recesses in the partition walls for conducting a heat transfer medium, which turf is integratable into the ice layer, and
the line network for the heat transfer medium runs in the lawn grid,
   comprising the steps of
   saturating the turf with water,
   completely freezing the water, and
   producing the artificial ice layer by means of uniform application of water.

2. The method according to claim 1, wherein the roots of the turf lie in a lawn support layer into which the lawn grid is embedded.

3. The method according to claim 2, further comprising a heat insulation layer situated underneath the turf.

4. The method according to claim 3, wherein the heat insulation layer being a foam glass gravel.

* * * * *